United States Patent
Hartz et al.

(10) Patent No.: US 10,977,215 B2
(45) Date of Patent: Apr. 13, 2021

(54) SYSTEM AND METHOD FOR STORAGE OPTIMIZATION IN A DE-DUPLICATION SYSTEM

(71) Applicant: International Business Machines Corporation, Armonk, NY (US)

(72) Inventors: Ezra Hartz, Saddlebrook, AZ (US); Heiko Schloesser, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 93 days.

(21) Appl. No.: 15/671,457

(22) Filed: Aug. 8, 2017

(65) Prior Publication Data
US 2019/0050418 A1 Feb. 14, 2019

(51) Int. Cl.
| G06F 3/06 | (2006.01) |
| G06F 16/174 | (2019.01) |
| G06F 11/14 | (2006.01) |
| H04L 29/08 | (2006.01) |

(52) U.S. Cl.
CPC ........ *G06F 16/1752* (2019.01); *G06F 3/0608* (2013.01); *G06F 3/0641* (2013.01); *G06F 3/0673* (2013.01); *G06F 11/1453* (2013.01); *H04L 67/1097* (2013.01)

(58) Field of Classification Search
CPC ............. G06F 17/30159; G06F 3/0641; G06F 11/1453; G06F 3/0608
See application file for complete search history.

(56) References Cited

U.S. PATENT DOCUMENTS

| 2010/0057984 | A1* | 3/2010 | Chen | G06F 12/0804 711/113 |
| 2011/0145523 | A1 | 6/2011 | Gupta et al. | |
| 2013/0018855 | A1* | 1/2013 | Eshghi | G06F 11/1453 707/692 |
| 2014/0157005 | A1* | 6/2014 | Leventhal | H04L 9/0637 713/193 |
| 2014/0325147 | A1* | 10/2014 | Nayak | G06F 3/0641 711/114 |
| 2016/0004716 | A1 | 1/2016 | Akirav et al. | |
| 2017/0206145 | A1* | 7/2017 | Panchanathan | G06F 11/1451 |
| 2018/0074746 | A1* | 3/2018 | Watanabe | G06F 3/0608 |

OTHER PUBLICATIONS

White Paper, EMC Data Domain Global Deduplication Array, Jan. 2011.

* cited by examiner

*Primary Examiner* — Adam M Queler
*Assistant Examiner* — Eric T Loonan
(74) *Attorney, Agent, or Firm* — Scully, Scott, Murphy & Presser, P.C.

(57) ABSTRACT

A data de-duplication system includes a storage device that includes multiple data sets, a fixed read-only storage area, and a processing device configured to perform certain functions. The system determines whether each of the multiple data sets has met a common pattern criteria, and if so, identifies the data set as a candidate data set for de-duplication. The common pattern criteria is indicative of whether a chunk data is frequently accessed among multiple users on a cloud. The system stores data in at least one candidate data sets in the fixed storage area. For each of the at least candidate data sets, the system generates a unique pointer that corresponds to a location of the at least one candidate data sets in the fixed storage area. The system further uses the pointers to de-duplicate the at least one candidate data sets.

20 Claims, 3 Drawing Sheets

SYSTEM AND METHOD FOR STORAGE OPTIMIZATION IN A DE-DUPLICATION SYSTEM

BACKGROUND

This disclosure relates to methods and systems for data de-duplication, and in particular to storage optimization in a de-duplication system using fixed pattern chunk data.

Traditionally, de-duplication of storage has been optimized for individual storage systems that are separated by location and networks and that are controlled by separate owners. However, these systems will not operate at their optimal performance on a cloud or a large network, in which user chunk data can be accessed by all the storage users of the de-duplication system. In other words, it is still a challenge for one user to provide the de-duplication for multiple users on the network. Further, in existing de-duplication systems, when removing duplicate data patterns, a system typically replaces each duplicate chunk data with a pointer that points to a location containing a physical copy of the chunk data. Depending on the duplication algorithm being used, data collision may occur when two different pieces of information refer to the same pointer, which result in data corruption. Other issues of data integrity may also exist when a storage device needs to be replaced and data in the storage device need to be re-generated.

SUMMARY

A data de-duplication system includes a storage device that includes multiple data sets, a fixed read-only storage area, and a processing device configured to perform certain functions. For at least one of the multiple data sets in the storage device, the system determines whether the data set has met a common pattern criteria. Upon determining that the data set has met the common pattern criteria, the system identifies the data set as a candidate data set for de-duplication. The system stores data in at least one candidate data sets in the fixed storage area. For each of the at least one candidate data sets, the system generates a unique pointer that corresponds to a location of the candidate data sets in the fixed storage area. The system uses the pointers to de-duplicate the at least one candidate data sets.

In some scenarios, each of the multiple data sets in the storage device is a chunk data representing one or more blocks in a medium of the storage device, a digital file, or a portion of a digital file. The storage device may also include meta-data and dynamic chunk data storage area containing the multiple data sets. The fixed storage area may reside independently of the meta-data and dynamic chunk data storage area. The fixed storage area may reside in the storage device and contain one or more partitions in the storage device. The fixed storage area may also reside in a physical storage device separate from the storage device. The size of the fixed storage area may be determined based on an accumulative size of the at least one candidate data sets. The at least one candidate data sets stored in the fixed storage area may be segmented or arranged in fashion similar to the data in the dynamic chunk data storage area segmented or arranged.

In some scenarios, a method for de-duplicating a storage device in the above illustrated systems may include: (i) for each of multiple data sets in the storage device, determining whether the data set has met a common pattern criteria; (ii) upon determining that the data set has met the common pattern criteria, identifying the data set as a candidate data set for de-duplication; and (iii) storing data in at least one candidate data sets in a fixed read-only storage area in the computer system. For each of the at least candidate data sets, the method may also generate a unique pointer that corresponds to a location of the candidate data sets in the fixed storage area, and use the pointers to de-duplicate the at least one candidate data sets. The method may further include retrieving data from the system by accessing the fixed storage area first before accessing the dynamic chunk data storage area.

In some or other scenarios, the common pattern criteria may include one or more of: (i) a number of times that the data set has been accessed by a user has exceeded a percentile among a number of total times that the plurality of data sets have been accessed by that user; and (ii) a number of users that have accessed the data set has exceeded a percentile among a total number of users that have accessed any of the plurality of data sets.

Alternatively, and/or additionally, for each candidate data set, the method may further determine whether the candidate data set is also compatible with a pattern generation algorithm. In response to determining that the candidate data set is compatible with the pattern generation algorithm, the method may include that candidate data set in the at least one candidate data sets for de-duplication.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 1:
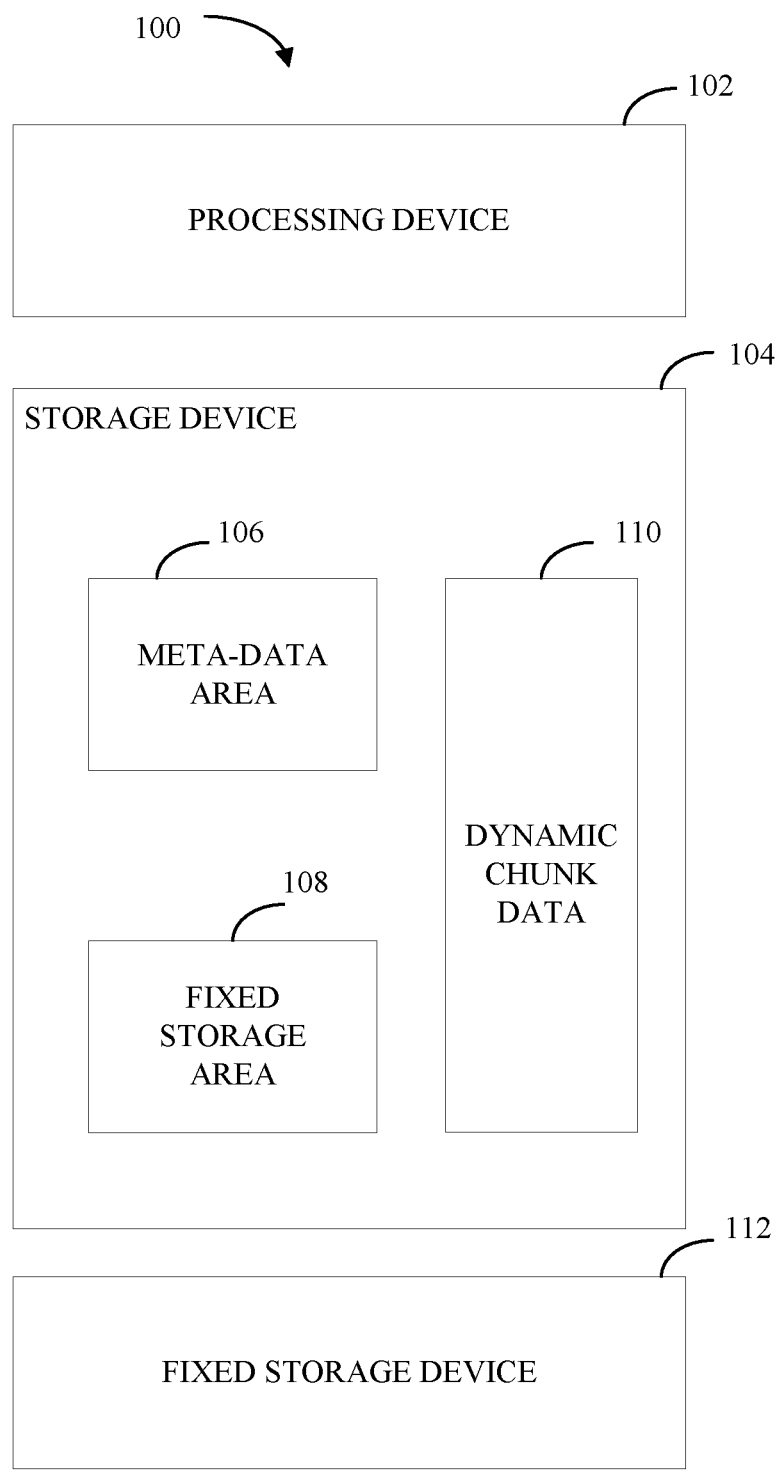
FIG. 1 is a block diagram of examples of hardware and/or electronics that may make up a de-duplication system.

In FIG. 1, a data de-duplication system 100 includes a storage device 104. The storage device 104 contains data that may be segmented into multiple data sets. Each data set may be contained in one or more data blocks in the storage device. Each data set is chunk data representing one or more blocks in a medium of the storage device, a digital file (e.g., a Word file, a PDF file), or a portion a digital file. The storage device 104 may contain user data or alternatively referred to as dynamic chunk data area 110 to store the multiple data sets. Optimization algorithms may be used to arrange the data sets so that they can be read or written efficiently. The storage device 104 may also include meta-data area 106, which contains pointers that point to various data sets stored in the chunk data area 110. A user may identify a data set by retrieving meta-data that is associated with the data set in the chunk data area 110, and use the meta-data to retrieve the actual data from the physical chunk data area 110.

In some scenarios, the de-duplication system 100 also includes a read-only fixed storage area 108. The fixed storage area 108 may reside in the storage device itself 104, for example, as one or more partitions of the storage device that are separate from the dynamic chunk data 110 and meta-data area 106. The fixed storage area 108 may also reside in a physical fixed storage device 112 that is separate from the storage device 104 and accessed by a local user of the storage device or multiple users on the network. Data in the fixed storage area 108 can only be read by a user but cannot be rewritten or removed. This prevents data corruption. On the other hand, if data stored in the fixed storage area is not being accessed or frequently accessed by the users, it may be a waste of resources because no other data can be written into it. The de-duplication system 100 is therefore capable of detecting common chunk data and store the common chunk data in the fixed storage area 108. Common chunk data is data that is most often accessed by a large number of users or frequently accessed by a single user.

In some scenarios, the system 100 also includes a processing device 102 that may be configured to perform various functions of the de-deduplication system, such as analyzing the data set to identify the common chunk data. In some scenarios, the processing device 102 may be configured to analyze multiple data sets in the storage device. For each data set in the storage device, the processing device determines whether the data set has met a common pattern criteria. Upon determining that the data set has met the common pattern criteria, the system may determine that the data set is common chunk data. The system may store the common chunk data in the fixed storage area. The system may also generate a unique pointer that corresponds to a location of the common chunk data in the fixed storage area, and use the pointer to de-duplicate the common chunk data.

Figure 2:
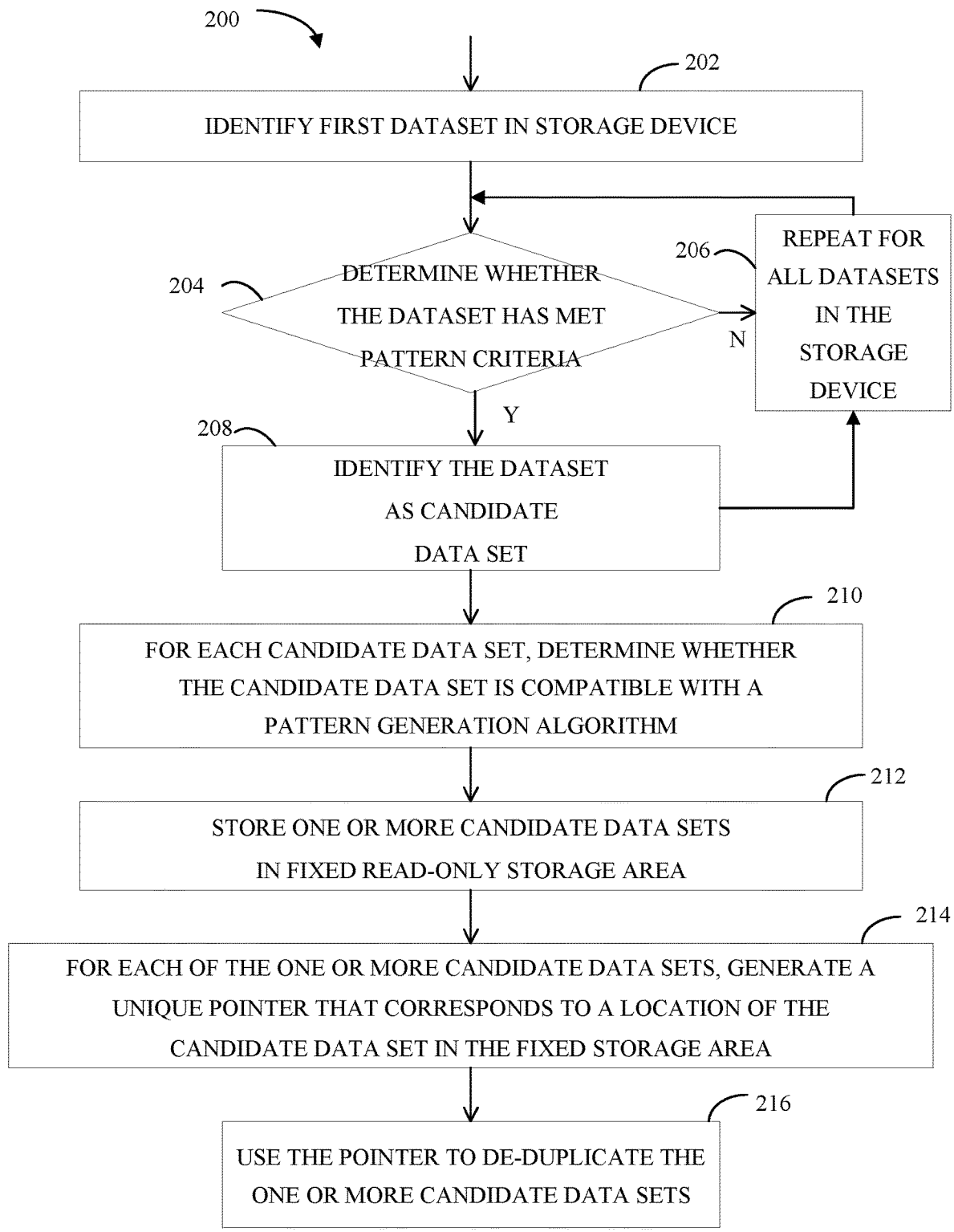
FIG. 2 is a diagram of an example of a process in a de-duplication system.

Various methods can be implemented in the above illustrated system. In some scenarios, as shown in FIG. 2, an non-limiting example of a process 200 in a de-duplication system includes: (i) identifying a first data set in the storage device 202; (ii) determining whether the data set has met a common pattern criteria 204; and (iii) upon determining that the data set has met the common pattern criteria, identifying the data set as a candidate data set for de-duplication 208. The process may repeat the steps (ii) and (iii) for all of the data sets in the storage device. While the de-duplication method is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 2, but the process may be integrated and/or one or more steps may be performed together, or the steps may be performed in the order disclosed or in an alternate order.

Upon identifying the candidate data set 208, the process may store one or more candidate data sets in a fixed, i.e., read-only storage area 212. In some scenarios, the process may determine to store all of the candidate data sets in the fixed storage area. In other scenarios, for each candidate data set, the process may determine whether the candidate data set is also compatible with a pattern generation algorithm of the system 210. In response to determining that the candidate data set is compatible with the pattern generation algorithm, the process may select the candidate data set to be used for further de-duplication. To be compatible with a pattern generation algorithm, the chunk data used in the fixed pattern section of the deduplication system would need to have some numerical pattern/commonality that would lend itself to algorithm pattern generation.

In de-duplicating a data set, the process may generate a unique pointer that corresponds to the location of that data set 214, which will be accessed by subsequent users who need to access that particular data set. The process may further use the pointer to de-duplicate the candidate data set 216 using any suitable de-duplicating algorithms. This frees up all of the duplicates of the data set in the storage device, thus reducing storage space.

Now, some of the above illustrated steps will be discussed in detail. The common pattern criteria used in the step of determining whether a data set has met a common pattern criteria for the fixed pattern read only storage area 204 may be defined in various ways. For example, on a cloud or in a networked environment, the common pattern criteria may include whether the number of times that the data set has been accessed by a user has exceeded a percentile among a number of total times that the plurality of data sets have been accessed by that user. The common pattern criteria may also include whether the number of users that have accessed the data set has exceeded a percentile among a total number of users that have accessed any of the plurality of data sets. In some or other scenarios, the process may be selective of the users and data that may be attributable to the common pattern criteria. For example, the common pattern criteria may be indicative of who the users will be, or what type of data stored may affect the types of patterns that are common. Additionally, the size of chunks in identifying the common pattern may also depend on the de-duplication design/algorithm. For example, the size of chunks may be representative of the largest common pattern that is the most common in a system where the chunk size is dynamically set to optimized deduplication. In other deduplication systems, the chunk size may be a fixed size based on analysis of commonly stored data and to reduce processing overhead.

In determining the percentile, the process may analyze an existing duplication system for many different users, and pool all the patterns or chunk data into one database to run statistics of a common pattern. For example, the process may examine the pooled data to determine how often the chunk data is used by each user or the number of pointers that reference the pattern as a percentile of the total number of times that user has accessed all of patterns. The process may also examine the pooled data to determine how many users use the pattern or the number of users that reference the pattern as a percentile of the total number of users that have accessed any of the data set.

In some or other scenarios, the process may determine a threshold percentile, above which the process may determine that the chunk data being analyzed has met the common criteria. Upon determining that a chunk data set has met the common criteria, the process may identify the chunk data set as a candidate data set for de-duplication, to be considered for moving the chunk data to a fixed storage area as fixed pattern, which will be explained in detail later. The percentile threshold may depend on the system design goal. For example, if the amount of fixed patterns is desired to be those that only are most common across users, then the process may select a higher range, such as 99% range. If data corruption prevention is valued to be higher than memory reduction, the process may select a lower range, such as 90% or lower. Alternatively, and/or additionally, in situations where there is a lack of need for RAID systems, fixed patterns may be more efficient from a cost of memory standpoint. In such a case, the process may select a lower percentile threshold.

In some scenarios, the process may configure the fixed storage area in various ways based on various considerations. For example, the process may set the size of fixed storage area based on the above analysis of the data set. The process may run an initial analysis of data in the storage device and determine the common chunk data sets. Then the process may set the size of the fixed storage area based on the total accumulative size of all of the common chunk data, for example, setting the size of the fixed storage area to be comparable to or larger than the total accumulative size of the common chunk data.

In some or other scenarios, the system may also designate a fixed size of memory, such as a fixed storage device, to the fixed storage area so that it can be easily replaced by other storage (e.g., a new fixed storage device) in case any data corruption occurs. In replacing a fixed storage device, the replacement storage device may have the same patterns in the same format as those data stored in the original storage device. The replacement storage device may also have meta-data, user data and fixed pattern, similar to the storage device illustrated in FIG. 1. The system may set the size of the fixed storage device based on the total accumulative size of the common chunk data obtained from above initial analysis.

Returning to FIG. 1, in some or other scenarios, the data stored in the fixed storage area may be arranged to best match the data arrangement in the dynamic chunk data area 110 so that the same storage optimization algorithms can be used. For example, the storage device may include meta-data 106 and dynamic chunk data area 110 containing multiple data sets. The above illustrated process may segment and arrange the data in the fixed storage area in a fashion similar to the plurality of data sets segmented and arranged in the dynamic chunk data storage area so that wasted storage space can be reduced.

In optimizing the de-duplicating system, the process illustrated above may further limit the pattern/chunk size based on de-duplicating system design and the above illustrated initial analysis of data with respect to common data chunks. For example, based on the sizes of the patterns/chunk used, the meta-data code can be added for these sized patterns. The meta-data codes can be used for searching for duplicates in the fixed storage area prior to searching the dynamic storage area. In some scenarios, the fixed storage area may be designed to enhance the existing de-duplication system by using similar calculation and data organizational structure as the dynamic chunk data. Alternatively, and/or additionally, if the desired fixed pattern arrangement is unable to meet a calculation or if the number of patterns is small, a search in the fixed pattern memory area may be sufficient. The search function is to ensure that patterns in the fixed read only portion of the system will not be duplicated in the dynamic chunk storage area to ensure the deduplication system is storing as efficiently as possible.

Figure 3:
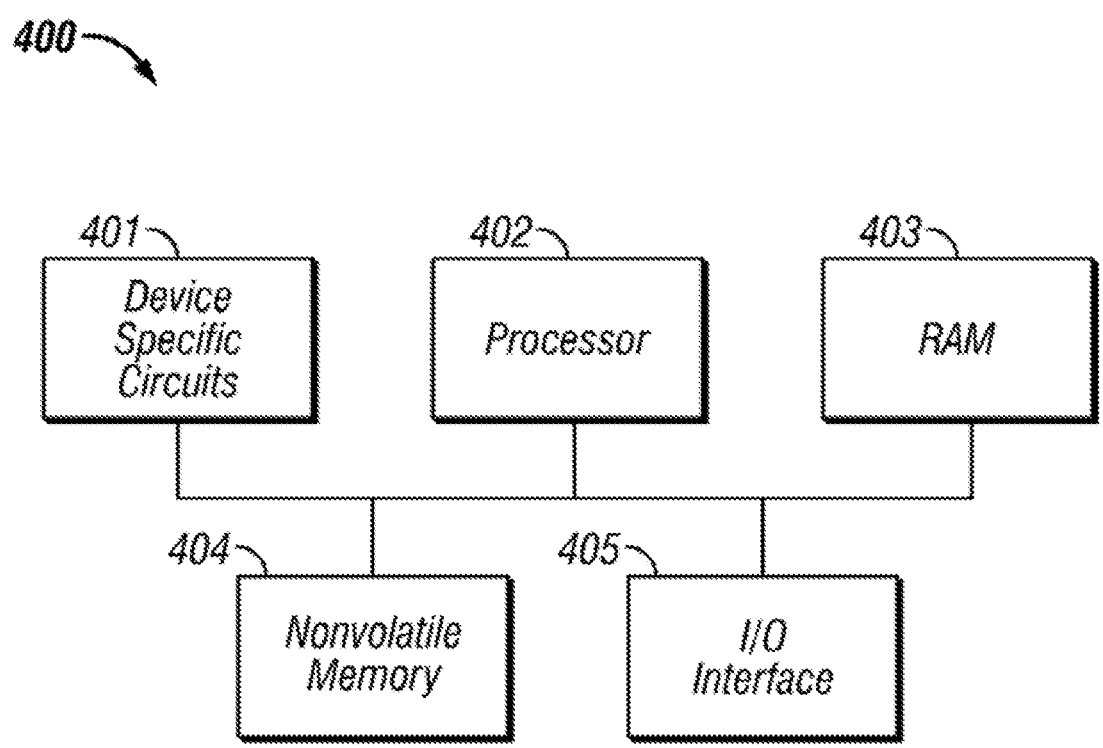
FIG. 3 is a block diagram of examples of hardware and/or electronics that may make up a processing device or a portion of a de-duplication system.

Referring now to FIG. 3, an example of a processing device 400, such as the processing device used for optimizing de-duplication systems (102 in FIG. 1), is shown to include a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is used to hold variable data, stack data, executable instructions, etc.

According to various approaches, the nonvolatile memory 404 may comprise any suitable type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 may be used to hold the executable firmware and any nonvolatile data containing programming instructions that can be executed to cause the processor 402 to perform certain functions, such as those illustrated in steps shown in FIG. 2.

The I/O interface 405 may include a communication interface that allows the processor 402 to communicate with devices external to the processing device, such as multiple devices or containers in a cloud network. Examples of the communication interface may comprise, but are not limited to, serial interfaces such as RS-232, USB (Universal Serial Bus), Small Computer Systems Interface (SCSI), RS-422 or a wireless communication interface such as Wi-Fi, Bluetooth, near-field communication (NFC) or other wireless interfaces. The processing device 400 may communicate with an external device via the communication interface 405 in any suitable communication protocols, such as HTTP, FTP etc.

The device specific circuits 401 provide additional hardware to enable the processing device 400 to perform unique functions on the storage device including, but not limited to, motor control of an accessor cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the processing device 400.

Optionally, the hardware may not need to include a memory, but instead programming instructions are run on one or more virtual machines or one or more containers on a cloud. For example, the processing device 102 (in FIG. 1) may be a server on a cloud that includes multiple virtual machines, each virtual machine having an OS, a virtual disk, virtual network and Apps, and the programming instructions for implementing various functions in the print system may be stored on one or more of those virtual machines on the cloud.

The illustrated systems and methods are advantageous to existing de-duplication technologies in that they optimize de-duplication systems on the cloud. The illustrated systems and methods may also work with any existing storage devices and de-duplication systems, and pattern generation algorithms, yet the chunk data will no longer only be optimized to a limited number of patterns customized dynamically for one user's data in an individual system due to all system user data being pooled into one container. In particular, the illustrated methods and systems reduce the amount of storage needed for each individual cloud de-duplication system and increase reliability for user chunk data. They provide a community network storage or data generation system/algorithm that covers all the possible user data chunk patterns required by all individual de-duplication storage systems. Further, if implemented on a network, storage for each user will be reduced due to user chunk data patterns being stored on a shared storage network or generated by an algorithm instead of user storage space.

Furthermore, the use of fixed patterns in optimizing de-duplication systems has no overhead for writing user chunk data because the data is a fixed pattern to which pointers are provided for access. Importantly, since the pattern is fixed for the user chunk data the possibility of data corruption is reduced. The pattern can also be re-generated if storage is damaged, which improves the reliability for user chunk data.

The present solution may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. 1-3 illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as the processing device 400 of FIG. 3. The memory elements can include local memory employed during actual execution of the program code, such as nonvolatile memory 404 of FIG. 3, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. It will be clear that the various features of the foregoing systems and/or methodologies may be combined in any way, creating a plurality of combinations from the descriptions presented above. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for de-duplicating a storage device in a computer system, comprising, by a processing device:
   for at least one data set of a plurality of data sets in a dynamic data chunk area in the storage device:
      determining whether the at least one data set has met a common pattern criteria, and
      in response to determining that the at least one data set has met the common pattern criteria, identifying the at least one data set as a candidate data set for de-duplication;
   storing the candidate data set in a fixed storage area in the computer system that is different than the dynamic data chunk area, wherein the candidate data set stored in the fixed storage area can be read but cannot be rewritten;
   generating a unique pointer that corresponds to a location of the candidate data set in the fixed storage area; and
   using the unique pointer to de-duplicate the candidate data set.

2. The method of claim 1, wherein the common pattern criteria comprises one or more of: (i) a number of times that the at least one data set has been accessed by a user has exceeded a percentile among a number of total times that the plurality of data sets have been accessed by that user; and (ii) a number of users that have accessed the at least one data set has exceeded a percentile among a total number of users that have accessed any of the plurality of data sets.

3. The method of claim 1, wherein each of the plurality of data sets is chunk data representing at least one of the group consisting of one or more blocks in a medium of the storage device, a digital file, a portion of a digital file, and combinations thereof.

4. The method of claim 1, wherein:
   the storage device also comprises a meta-data storage; and
   the fixed storage area that can be read but not rewritten resides independently of the meta-data storage area and the dynamic chunk data storage area.

5. The method of claim 4, wherein a plurality of data sets are identified as candidate data sets and a size of the fixed storage area is based on an accumulative size of a total number of the candidate data sets identified.

6. The method of claim 4, wherein:
   storing the candidate data set in the fixed storage area that can be read but not rewritten comprises segmenting and arranging the data in the candidate data set using the same criteria as the plurality of data sets are segmented and arranged in the dynamic chunk data storage area.

7. The method of claim 4, further comprising retrieving data from the computer system by accessing the fixed storage area that can be read but not rewritten before accessing the dynamic chunk data storage area.

8. The method of claim 1, wherein a plurality of data sets are identified as candidate data sets and the method further comprises:
   for each candidate data set:
      determining whether the candidate data set is also compatible with a pattern generation algorithm; and
      in response to determining that the candidate data set is compatible with the pattern generation algorithm, including that candidate data set in the plurality of candidate data sets for de-duplication.

9. A data de-duplication system comprising:
   a storage device comprising a plurality of data sets, the plurality of data sets stored in a dynamic chunk data storage area;
   a fixed storage area wherein data stored in the fixed storage area can be read but can not be rewritten; and
   a processing device configured to:
      for at least one data set of the plurality of data sets in the storage device:
         determine whether the at least one data set has met a common pattern criteria, and
         in response to determining that the at least one data set has met the common pattern criteria, identify the at least one data set as a candidate data set for de-duplication;
      store the candidate data set in the fixed storage area;

for the candidate data set stored in the fixed storage area, generate a unique pointer that corresponds to a location of the candidate data set in the fixed storage area; and use the unique pointer to de-duplicate the candidate data set.

10. The system of claim 9, wherein the common pattern criteria comprises one or more of: (i) a number of times that the at least one data set has been accessed by a user has exceeded a percentile among a number of total times that the plurality of data sets have been accessed by that user; and (ii) a number of users that have accessed the at least one data set has exceeded a percentile among a total number of users that have accessed any of the plurality of data sets.

11. The system of claim 9, wherein at least one of the plurality of data sets is chunk data representing at least one of the group consisting of at least one block in a medium of the storage device, a digital file, a portion of a digital file, and combinations thereof.

12. The system of claim 9, wherein:
the storage device also comprises a meta-data storage area; and
the fixed storage area resides independently of the meta-data storage area and the dynamic chunk data storage area.

13. The system of claim 12, wherein the fixed storage area resides on a physical storage device separate from the storage device.

14. The system of claim 12, wherein the fixed storage area resides on the storage device.

15. The system of claim 12, wherein a plurality of data sets are identified as candidate data sets and a size of the fixed storage area is based on an accumulative size of a total number of candidate data sets identified.

16. The system of claim 12, wherein the processing device is further configured to retrieve data by accessing the fixed storage area before accessing the dynamic chunk data storage area.

17. The system of claim 9, wherein:
the storage device also comprises a meta-data storage area; and
storing the candidate data set in the fixed storage area comprises segmenting and arranging the data in the candidate data set using the same criteria as the plurality of data sets are segmented and arranged in the dynamic chunk data storage area.

18. The system of claim 9, wherein the processing device is further configured to:
determine whether the candidate data set is also compatible with a pattern generation algorithm; and
in response to determining that the candidate data set is compatible with the pattern generation algorithm, include that candidate data set in the candidate data set for de-duplication.

19. A method for reducing storage demands in a computer system, comprising, by a processing device:
for at least one data set of a plurality of data sets in a dynamic chunk data storage area in a storage device:
determining whether the at least one data set has met a common pattern criteria, and
in response to determining that the at least one data set has met the common pattern criteria, identifying the at least one data set as a candidate data set for de-duplication;
storing the candidate data set in a fixed storage area in the computer system wherein the candidate data set stored in the fixed storage area can be read but cannot be rewritten; and
for the candidate data set stored in the fixed storage area that can be read but not rewritten, generating a unique pointer that corresponds to a location of the candidate data set in the fixed storage area that can be read but not rewritten.

20. The method of claim 19, further comprising using the unique pointer to de-duplicate the candidate data set.

* * * * *